United States Patent
Gleine (10) Patent No.: US 9,070,299 B2
(45) Date of Patent: Jun. 30, 2015

(54) ARRANGEMENT COMPRISING A MOCK-UP FOR REPRODUCING AND TESTING AN AIRCRAFT PASSENGER CABIN

(75) Inventor: Wolfgang Gleine, Kakenstorf (DE)

(73) Assignee: Airbus Operations GmbH, Hamburg (DE)

( * ) Notice: Subject to any disclaimer, the term of this patent is extended or adjusted under 35 U.S.C. 154(b) by 953 days.

(21) Appl. No.: 12/316,470

(22) Filed: Dec. 12, 2008

(65) Prior Publication Data

US 2009/0259426 A1   Oct. 15, 2009

Related U.S. Application Data

(60) Provisional application No. 61/008,706, filed on Dec. 21, 2007.

(51) Int. Cl.
*G09B 9/16* (2006.01)
*G09B 9/08* (2006.01)
*G09B 19/16* (2006.01)

(52) U.S. Cl.
CPC ............... *G09B 9/08* (2013.01); *G09B 19/165* (2013.01)

(58) Field of Classification Search
CPC ........................................................ G09B 9/16
USPC ................................... 434/30, 34, 37, 45, 49
See application file for complete search history.

(56) References Cited

U.S. PATENT DOCUMENTS

| 4,347,055 A * | 8/1982 | Geiger ............................. 434/30 |
| 4,765,193 A * | 8/1988 | Holden et al. ............... 73/865.9 |
| 5,111,402 A * | 5/1992 | Brooks et al. ................ 701/29.2 |
| 5,415,551 A * | 5/1995 | Semenza ....................... 434/226 |
| 5,556,340 A * | 9/1996 | Bohn et al. ...................... 472/59 |
| H001728 H * | 5/1998 | Kelso et al. ..................... 434/43 |
| 6,572,376 B1 * | 6/2003 | Saunders ......................... 434/30 |
| 6,634,885 B2 * | 10/2003 | Hodgetts et al. ................ 434/55 |
| 7,136,457 B1 * | 11/2006 | Blood et al. ..................... 379/21 |
| 2004/0265111 A1 * | 12/2004 | Bocquet et al. ............ 414/744.1 |
| 2006/0081628 A1 * | 4/2006 | Myers et al. ................... 220/1.5 |
| 2006/0126608 A1 * | 6/2006 | Pereira et al. ................ 370/360 |
| 2006/0174706 A1 * | 8/2006 | Gleine ........................... 73/586 |
| 2012/0013093 A1 * | 1/2012 | Frank et al. ................ 280/79.11 |

FOREIGN PATENT DOCUMENTS

| DE | 1231571 | 12/1966 |
| DE | 19529741 | 2/1997 |
| DE | 19638324 | 11/1997 |
| DE | 29721927 | 5/1998 |
| DE | 29809772 | 9/1998 |
| DE | 20210946 | 11/2002 |
| DE | 10361890 | 7/2005 |

OTHER PUBLICATIONS

German Office Action, Oct. 17, 2008.
German Office Action, Apr. 24, 2013.

* cited by examiner

*Primary Examiner* — Bruk Gebremichael
(74) *Attorney, Agent, or Firm* — Greer, Burns & Crain Ltd.

(57) ABSTRACT

An arrangement including a supporting structure and a reproduction of an aircraft passenger cabin, arranged inside the supporting structure. The aircraft passenger cabin is on a 1:1 scale for receiving components of cabin systems. The supporting structure is composed of standardized elements, for receiving components of the cabin system. The cabin fittings including standardized supports and connections so that the components of the cabin system can be tested under operating conditions.

20 Claims, 5 Drawing Sheets

ARRANGEMENT COMPRISING A MOCK-UP FOR REPRODUCING AND TESTING AN AIRCRAFT PASSENGER CABIN

FIELD OF THE INVENTION

The invention relates to an arrangement comprising a supporting structure and a mock-up, arranged with the supporting structure, in order to reproduce an aircraft passenger cabin.

BACKGROUND OF THE INVENTION

In the aviation industry it is conventional to reproduce aircraft passenger cabins by using mock-ups. These mock-ups are generally produced on a 1:1 scale and are arranged within a supporting structure which corresponds functionally to the fuselage structure of the aircraft. The mock-ups serve a number of purposes. First and foremost, they provide an accessible reproduction of the passenger cabin to be subsequently produced, the reproduction corresponding exactly to the passenger cabin to be produced on both a geometric and a visual level. For this purpose, the same materials, matched with respect to colour, are used for example for the floor, wall panels and roof lining as those which will be subsequently used in the final assembly process. In this way, the effect of the colour scheme and spatial design of the cabin fittings on the mood of potential passengers and/or crew can be tested. Furthermore, the creation of different mock-ups with different styling can facilitate the decision-making procedure of potential customers. The addition of fixtures such as passenger seats, galleys, toilets, luggage compartments and lighting equipment forms an environment identical to the cabin to be subsequently produced. This is a practical way of trying out different ideas in terms of fittings, for example different seating designs, and the way these fittings interact with potential passengers can be investigated. A further purpose of these mock-ups is to investigate and optimise the ergonomic interaction between the people involved on the one hand and the fixtures in the cabin on the other under realistic visual conditions. Corresponding findings can be achieved to a limited extent by purposefully studying appropriate drawings and/or by means of virtual reality, but only mock-ups on a 1:1 life-size scale provide a true indication of a customer's experience in the cabin. Mock-ups of the aforementioned type are consequently a necessary link in the chain of development of an aircraft cabin. However, a substantial drawback of mock-ups of this type is that a new mock-up has to be produced for every variant in terms of fittings. Since ever increasing numbers of fittings variants are required simultaneously for a particular aircraft type for the purposes of validation and verification, considerable costs in terms of labour and material are incurred. When a mock-up is no longer required, the majority of the material used, including the supporting structure, cannot be used for other purposes and must be disposed of. The above shows that the advantages of the aforementioned mock-ups are only useful for a small part of the activities to be carried out during the development of an aircraft passenger cabin. The use of these mock-ups basically applies to the development and optimisation of the appearance of cabin fittings. In contrast, the cabin equipment includes lighting, air-conditioning, communications, safety, fresh water, sewage systems, etc. The aforementioned systems are developed and optimised by conventional procedures using, inter alia, appropriate test rigs which are constructed separately independently of the respective mock-up. These test rigs are specific experimental set-ups which are accommodated in a fixed manner in testing sites or laboratories, depending on the test requirements, and have the function of identifying the properties of components, systems and cabin installations. For this purpose, special devices are integrated in these test rigs for detecting these measurement data and simulating the system environment. The individual test stands are connected to one another in part by means of an electrical or fibre-optic data exchange to fulfil functions to which a plurality of cabin systems contribute, the connections, which are determined by the spatial conditions, not being able to be constructed as originally intended, and therefore possibly resulting in part in unrealistic system performance. In order to avoid these drawbacks, systems which interact closely with one another are constructed once again in a fixed manner in another test rig with original connections. In some cases, supporting structures for simulating the fuselage structure of the aircraft are also required to construct these system-related test rigs. Devices for experimentally testing comfort-related requirements in particular in the cabin are used to determine whether specific defined requirements or specifications are satisfied. In isolated cases which are not known in the art, this is already achieved in actual mock-ups of fittings in which the visual impression of a cabin can be determined by developers and customers. The cooperation between a fittings variant with specific features for carrying out cabin functions, for example the interaction between one or more systems with fittings components, is not tested in this case. A substantial disadvantage of the test rigs described above is that a plurality of test set-ups are required to carry out individual system tests and to achieve system integration, thus resulting in high material and labour costs.

In addition, a large proportion of the material used, in particular for the supporting structure, cannot be used further in subsequent tasks. It is further disadvantageous that the individual test set-ups are installed in a fixed manner in a laboratory or a test hall, so it is not possible to move the test rigs for location-independent testing. It follows from the above that the field of application of the development of cabin systems for aircraft, insofar as it involves the reproduction of fittings and equipment for the purposes of reproducing complex physical processes and/or the validation of operability or comfort properties, represents a phase of aircraft development which requires a high degree of expenditure in terms of material and workmanship before the aircraft is actually produced.

SUMMARY OF THE INVENTION

An object of the invention is therefore to simplify cabin-related experimental devices for the purposes of validation and verification in such a way that considerable savings can be made with respect to the material used for mock-ups and labour, in particular the labour involved in producing mock-ups.

In an arrangement comprising a supporting structure and a mock-up, which is arranged within the supporting structure, for reproducing an aircraft passenger cabin on a 1:1 scale and for receiving components of cabin systems, this object is achieved in accordance with claim 1 by the fact that the supporting structure is formed of a structural reproduction, composed of standardised elements, for receiving components of the cabin systems and of the cabin fittings and comprises standardised supports and connections in such a way that these components can be tested under operating conditions and at least one displaceable test module is provided comprising multifunctional test rigs for operating and testing the cabin systems.

In this case it is advantageous that tests can be carried out independent of location so that a mobile test stand can be constructed during system development, which is carried out to a large extent by suppliers, this mobile test stand initially being used on site by development engineers on the relevant supplier's premises for the processes of development, evaluation and quality control and, after completion of the development of the individual system/individual component at that company, subsequently being supplied to the aircraft manufacturer together with the developed products either as a whole or in modules for further integration.

Further advantageous configurations of the invention are specified in the sub-claims.

BRIEF DESCRIPTION OF THE DRAWINGS

The invention is explained in greater detail in the description and is shown in the drawings, in which.

DETAILED DESCRIPTION OF THE INVENTION

Figure 1:
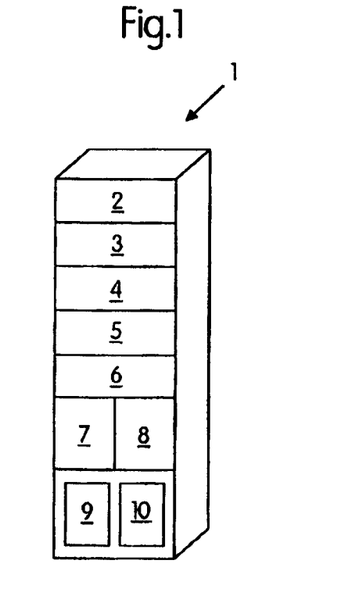
FIG. 1 shows a test rig.

FIG. 1 shows one of a plurality of test rigs 1 as used within the scope of the invention. These test rigs are accommodated in standardised housings and are releasably mounted on the respective base by standardised supports. Each test rig 1 comprises an I/O unit 2 which functionally connects the signal sources of the external test objects to the internal functional units of the respective test rig 1. The I/O units 2 all contain converters which are required for this purpose, in particular analogue-digital converters. The I/O unit 2 further comprises a network interface via which data is exchanged between the test rigs 1 participating in a test. In addition, each I/O unit 2 also comprises interfaces to the input and display devices required for operation. The test rig 1 further comprises a unit 3 for simulating a system environment. This unit 3 enables system components to be tested under operating conditions by simulating the system environment with which these components are intended to cooperate. It is also possible to test subsystems using this unit 3 by simulating the other parts of the entire system concerned. The reference numeral 4 denotes a simulation unit which simulates the systems to be tested. For this purpose data regarding cabin fittings variants/system configurations can be stored within these units in order to simulate these variants. This allows, for example, airline requirements to be validated completely at an early state of development, the spatial design and colour scheme, lighting and available space of the interior fittings being shown realistically. Each test rig 1 comprises what is known as a test machine 5 for controlling the test procedure. In this test procedure, individual measurements are taken in accordance with preset measurement programs and the results are recorded and stored or relayed to the I/O unit 2. Each test rig 1 further comprises a power supply unit 6, by means of which systems to be tested are supplied with electrical energy. A direct voltage of 28 V and an alternating voltage of 115 V at 400 Hz are provided in particular. Patch panels 7 and 8 are provided for configuring the test rig 1 in terms of hardware by means of freely selectable electrical plug connections. Finally, two object regions 9 and 10, which can be accessed from outside, are arranged in each test rig 1 for receiving original components. These components can be connected to the electronics of the respective test rig 1 by means of standardised plug and socket connectors (not shown). If the aforementioned original components are located in corresponding system simulations within a mock-up, these objects are connected to the plug and socket connectors of the test rig 1 concerned via data lines. From a technical point of view, each test rig 1 represents a self-contained arrangement for electronic data processing and comprises conventional digital units such as processors, instruction memory units, data memory units, program memory units and interfaces. Although the individual test rigs 1 are almost identical in terms of their mechanical and electrical construction, they are nevertheless suitable for carrying out very different test procedures. Since the computing power of the test rigs 1 is limited, a plurality of test rigs 1 may be necessary to test a very extensive system. The programs to be used to carry out a system test and the set values which form the basis of the tests are both permanently stored within the respective test rig 1. Each test rig 1 is therefore specialised for the test operation stored. In this way, the individual test operations can be carried out and the results stored in an appropriate memory where they are available to be output via the I/O unit 2 and displayed on a screen and/or to be output via a printer. The test rigs 1 shown are allocated specific test tasks due to the software installed in each case. In this way, it is for example possible for a test rig 1 to be equipped to test a cabin information and data system, another test rig 1 to be equipped to test an oxygen system and a further test rig 1 to be equipped to test cabin installations.

Figure 2:
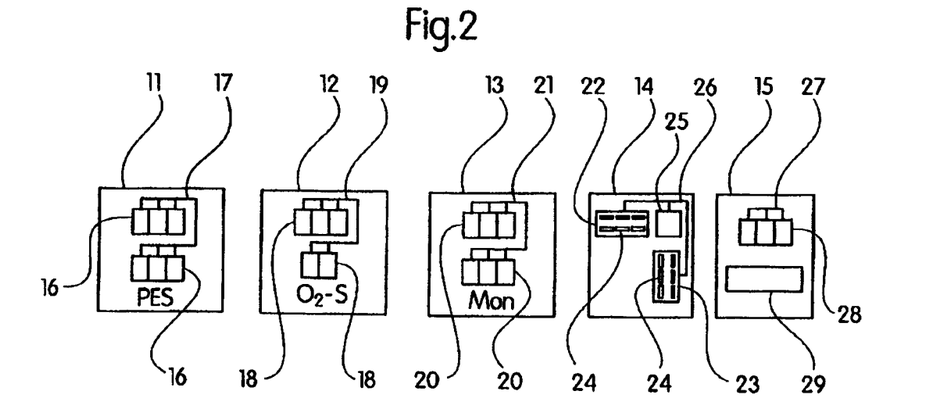
FIG. 2 shows different test modules.

FIG. 2 is a plan view of a plurality of test modules 11 to 15, which differ from one another in the type and number of the test rigs arranged thereon. The test modules 11 to 15 are substantially composed of an underbody which is capable of bearing a load, are accessible and comprise standardised supports on their respective facing outer edges, by means of which supports they can be assembled in a modular manner to form test platforms. It will now be shown by way of example how the individual test modules can be constructed and formed. It is possible to deviate from the descriptions shown depending on the test requirements and system architecture. The test modules 11 and 13 are each provided with six test rigs and the test module 12 is provided with five test rigs. The test module 11 tests passenger entertainment systems and is accordingly denoted by PES. The test rigs arranged thereon are denoted with the reference numeral 16 due to their particular task. All test rigs 16 are connected to one another by a network 17. The test module 12, labelled $O_2$—S, comprises five test rigs 18. These test rigs are connected to one another by a network 19 and test an oxygen system. The test module 13, labelled Inst, contains six test rigs 20 which test cabin installations such as galleys and toilets and are connected to one another by a network 21. The next test module shown is an operating module 14 which contains all of the devices used by the testers to operate the test rigs arranged on the test modules. All the test runs being carried out in the test rigs can be controlled, monitored and analysed from this module. For this purpose, two computer workstations 22, 33, each having three operator control panels 24 are provided. A printer 25 completes the computer workbench and substantially acts to output test results. The test module 15 tests the devices arranged in the electronics bay of an aircraft and contains three test rigs 28 and a test bench 29 which are correspondingly connected by a network 27. Since the test modules shown can be moved, they can be used not only at the premises of the aircraft manufacturer to test and develop cabin systems, but it is also possible for them to be used by a manufacturer of cabin system components to develop and test these components. This enables the appropriate tests to be carried out on the premises of the component manufacturer using the aircraft manufacturer's specifications. For example, it is possible to test electronic devices such as system controllers at the manufacturer's site by using a test module 15 in conjunction with an operating module 14. For this purpose, the modules 14 and 15 are connected to one another via a digital data bus (not shown) and the device to be tested, which is located on the test bench 29, is connected to the test rigs 28 via a diagnostic connector. The test arrangement assembled in this way is operated by the operating module 14. In addition to the aforementioned test modules 52 to 54 for testing the PES, oxygen system, cabin installations and system controllers, further similarly constructed and therefore not shown test modules are provided for testing the following systems:
1. air-conditioning system,
2. cabin information and data systems,
3. door systems.

Figure 3:
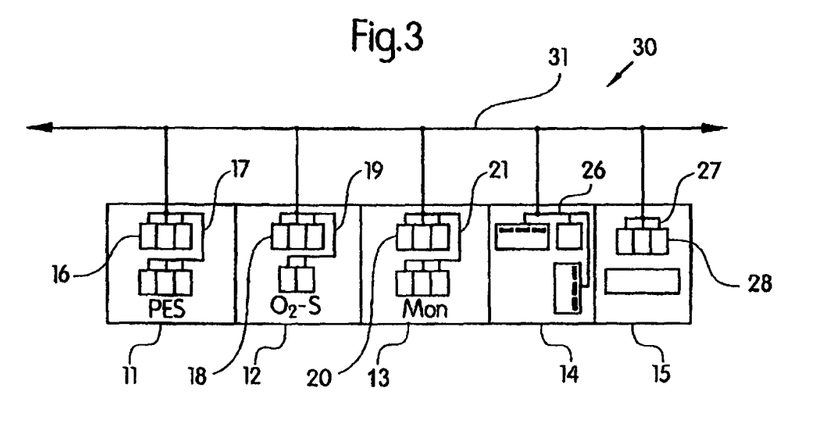
FIG. 3 shows a test platform.

FIG. 3 shows a test platform 30 which is constructed in a modular manner from the test modules 11 to 15. The platform 30 forms an accessible, rigidly assembled constructional unit. It is movable and can be positioned in the vicinity of the objects to be tested by a crane or a forklift truck. The electronic devices arranged on the individual test modules are connected to one another via a digital data bus 31, the individual test modules 11 to 15 being connected to the data bus 31 via standardised plug and socket connectors. In this way the functionality of the entire test platform 30 is obtained from a large number of individual functions for testing cabin systems which are provided by the test rigs 16, 18, 20, 28 located on the test modules 11 to 15. Any desired type of test module can be used to construct a test platform and depends on the test objectives to be achieved.

Figure 4:
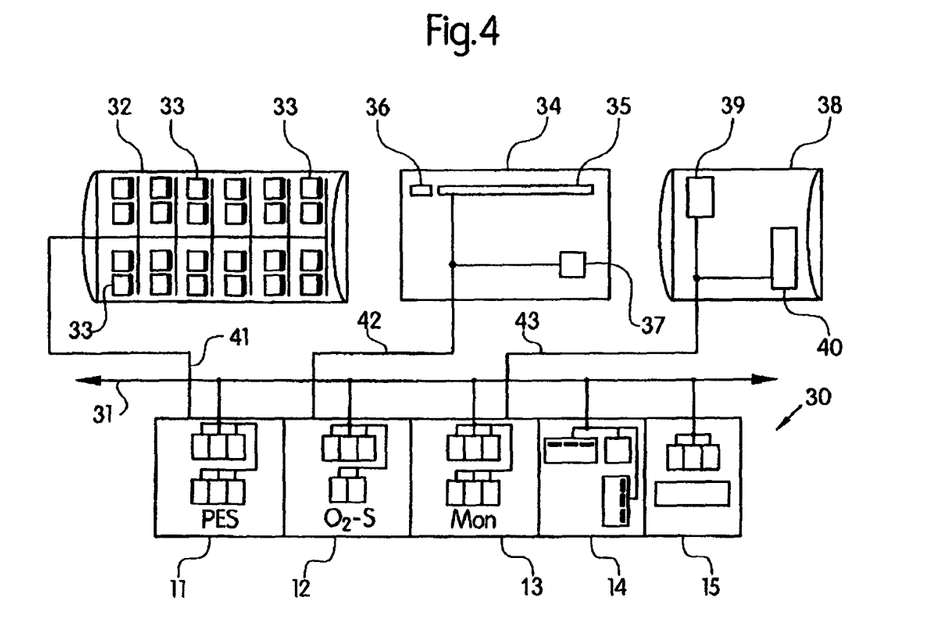
FIG. 4 shows an arrangement of a test platform with test objects.

FIG. 4 is a schematic view of the test platform 30 of FIG. 3 comprising the data bus 31 to which all of the test rigs of the test modules 11 to 15 are connected. The drawing shows a reproduced structure 32 of a cabin portion comprising a set of passenger seats 33. A container 34 comprising an oxygen system 35, an oxygen source 36 and a local test rig 37 is also shown in this drawing. The oxygen system 35 is to a large extent constructed from original parts such as pipelines, oxygen masks and valves. The drawing further shows a structural reproduction 38 comprising a toilet 39 and a galley 40. The test module 11 is connected via a test line 41 to entertainment devices (not shown) associated with the seats 66 for testing the passenger entertainment system PES.

The container 34 is connected to the test module 11 via a data line 42 to test the oxygen system therein. The test module 13 is further connected to the structural reproduction 38 via a test line 43 to test the cabin installations. This enables the toilet 39 and the galley 40 to be tested. In this way all of the relevant functions can be tested both technically and operationally, such as the following:
1. heating,
2. cooling,
3. coffee-making,
4. testing the ovens,
5. controlling the ovens,
6. available space, ergonomics and operability, lighting, ventilation.

Figure 5:
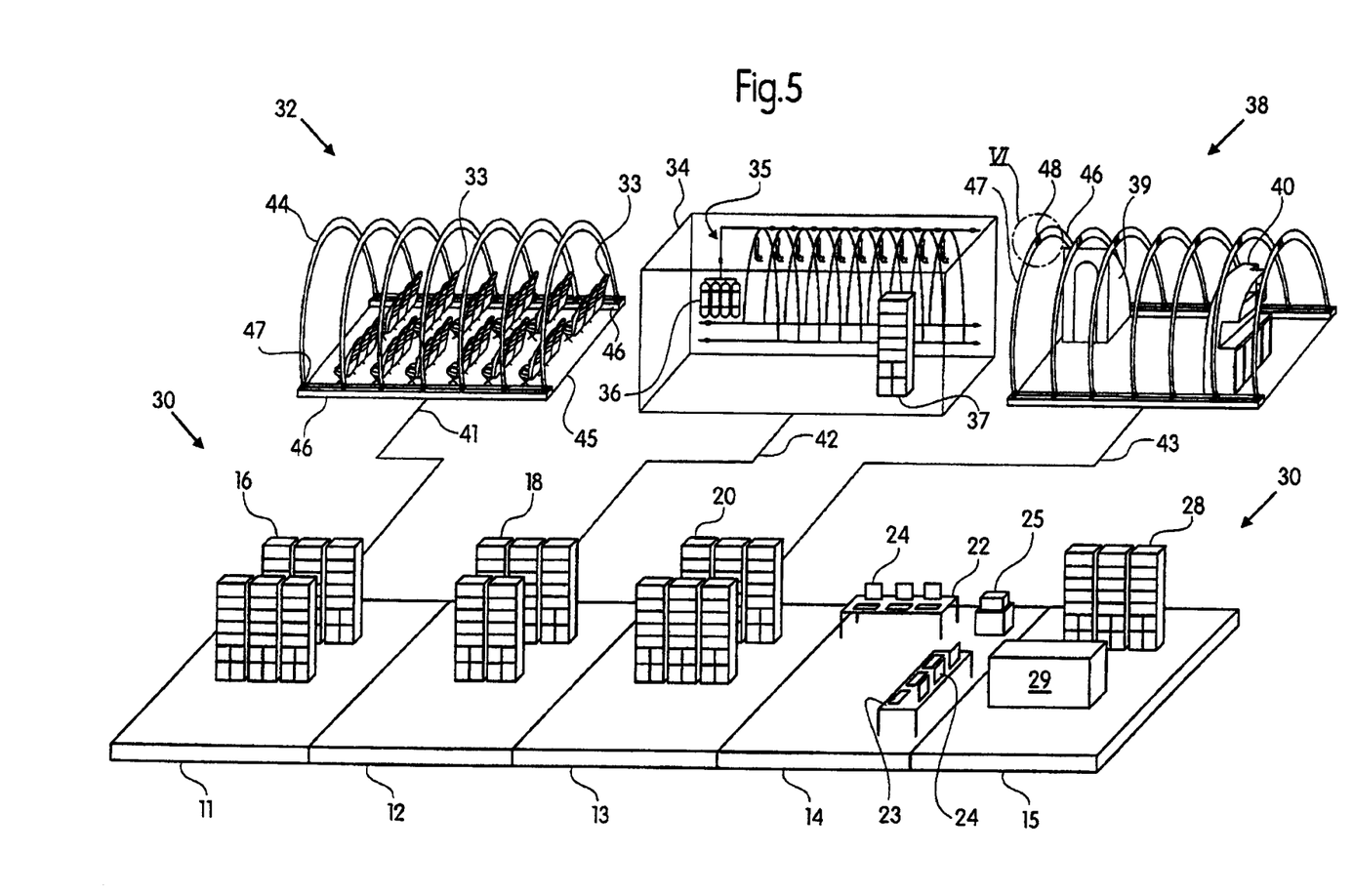
FIG. 5 is a perspective view of the arrangement in FIG. 4.

FIG. 5 shows the test arrangement according to FIG. 4, in a perspective view this time, composed of the test modules 11 to 15, the structural reproduction 32, the container 34 and the structural reproduction 38. The test modules 11 to 15 which are assembled to form the test platform 30 have the same components as shown in FIG. 4, namely the test rigs 16, 18, 20, 28, the printer 25, the test bench 29 and the computer workstations 22, 23 with the operator control panels 24. A set of passenger seats 33 is arranged inside the structural reproduction. The structural reproduction 38 contains the cabin installations of the toilet 39 and the galley 40. Data is transferred between the test modules 11, 12 and 13 on the one hand and the structural reproduction 32, the container 34 and the structural reproduction 38 on the other by means of the data lines 41, 42 and 43. The structural reproduction 32 is basically comprises frames 44, a floor 45 and lateral longitudinal supports 46. The frames 44 can be assembled as desired in the longitudinal direction on the longitudinal supports 46 by means of brackets 47. The aforementioned elements are standardised and can be connected to one another in a modular manner. One configuration of the frame involves said frame being formed of two halves 46, 47 which are connected to one another in an articulated or releasable manner. In the case shown, the halves 46, 47 are connected by means of a hinge 48. The container 34 contains an oxygen system 35 comprising an oxygen source 36 and a local test rig 37. Using a container of this type is useful if it is necessary for both system suppliers and aircraft manufacturers to carry out successive tests at different locations. The systems or system modules installed in the container must of course be constructed in such a way that the prevailing physical conditions correspond exactly to those used in practice. In the case of the aforementioned oxygen system, this means that the oxygen sources, valves, line cross-sections, line lengths, in particular the part-lengths between the connected components and the further connected devices used in the test construction correspond to those used in practice. Instead of using a true-to-scale spatial structural reproduction to receive a test arrangement of this type, a planar object support, for example a container wall as shown in the drawings, may be used. All of the required tests may be carried out on the oxygen system 35 shown by using the local test rig 37 in order to ensure it is operating correctly. Since the system is accommodated in a container, it can be transported to the aircraft manufacturer for the purposes of system integration into the aircraft cabin.

Figure 6:
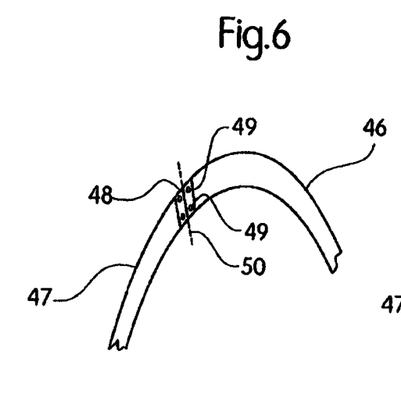
FIG. 6 is the detail VI from FIG. 5.

FIG. 6 shows the detail VI from FIG. 5 comprising the halves 46, 47 and the hinge 48. The hinge 48 is rigidly connected to the halves 46, 47 by rivets 49 and enables the halves 46, 47 to be pivoted about the axis of rotation 50 and thus folded. This articulated, but not releasable connection reduces the amount of storage space required to hold the frame if said frame is intended to be stored after completion of a test program.

Figure 7:
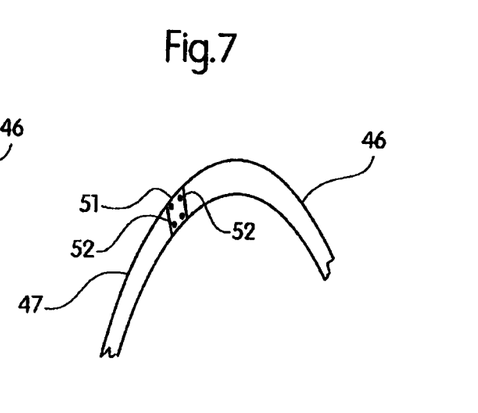
FIG. 7 shows a frame with link plates.

FIG. 7 shows another way of connecting the halves 46, 47 to one another. In this case, a link plate 51 is used which is connected to both halves 46, 47 by screws 52. This releasable connection enables both halves 46, 47 to be stored separately, and this also reduces the storage space required for the frames.

Figure 8:
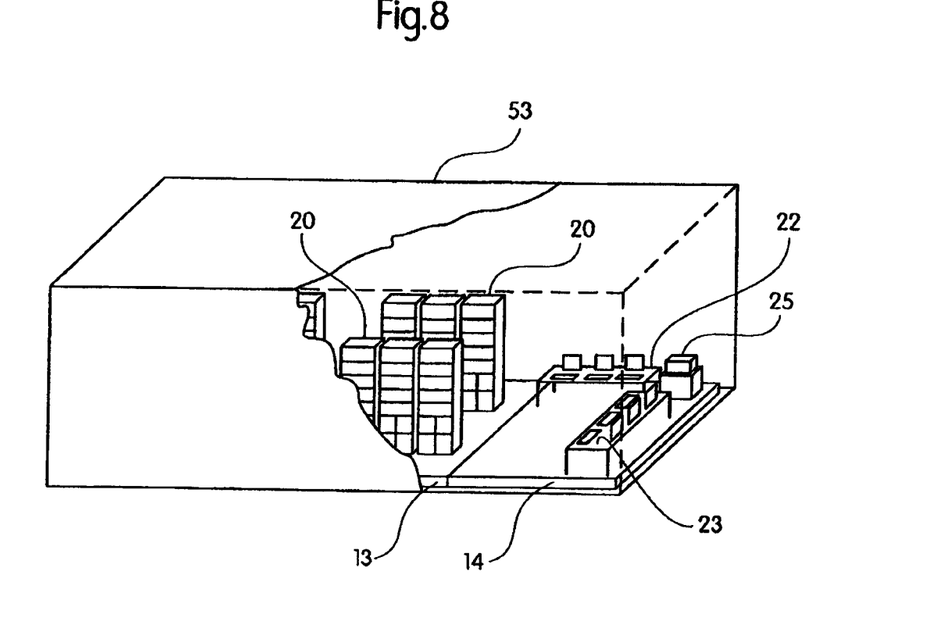
FIG. 8 shows a container.

FIG. 8 shows a container 53 containing the test modules 13 and 14 comprising the components described above for carrying out system tests. The test modules 13 and 14 comprise six test rigs 20 and, inter alia, the computer workstations 22, 23 and the printer 25. The modules are installed in a fixed manner inside the container 53, all of the functional units present being connected to one another by data lines. This container therefore contains a transportable and accessible test laboratory. In this case the dimensions of the modules are selected in such a way that said modules can be installed in the respective container in a modular manner. The number of modules which can be accommodated by a container depends on the size of the modules. Arranging the test rigs inside transport containers enables the respective existing arrangement of test rigs to be transported, in their existing configuration for carrying out comprehensive system tests, by suitable transport means and enables said arrangement to be positioned in the vicinity of objects to be tested. During operation, the operators in the accessible containers are shielded from external influences, such as noise in the production plant. During breaks, unauthorised persons are prevented from entering the container by means of lockable access points.

Figure 9:
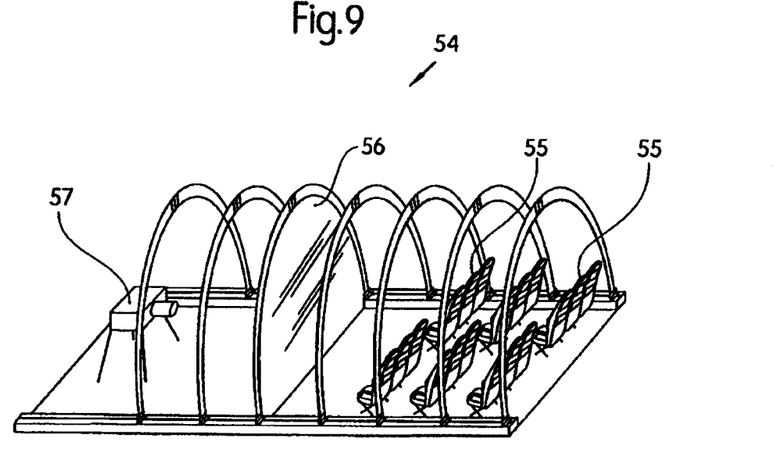
FIG. 9 shows a structural reproduction with a projector and
FIG. 10 is a view of a passenger cabin.

FIG. 9 shows a structural reproduction 54 comprising a set of passenger seats 55 and a projection screen 56 and a projector 57. This arrangement enables different configurations of a passenger cabin to be shown on the projection screen 56. For this purpose, graphics data of fittings variants which are stored in the simulation unit of a test rig are supplied to the projector, preferably a data beamer.

Figure 10:
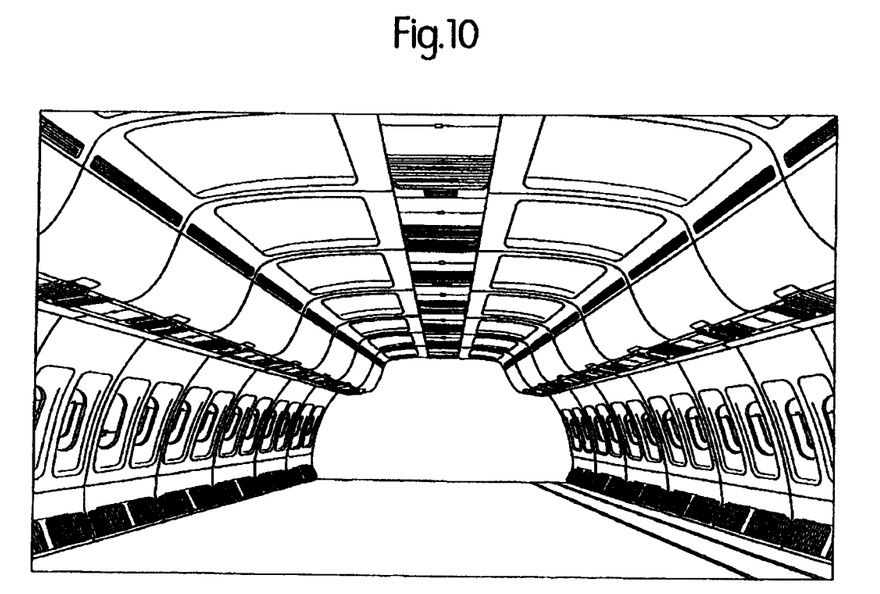

FIG. 10 shows an image of a passenger cabin projected in this way. Using images of this type enables the geometry and colour scheme of different fittings variants of a passenger cabin to be shown so they can be assessed. It is therefore no longer necessary to form the objects shown by using hardware components. The aforementioned variants are instead produced as computer graphics and provide a perspective image which is very similar to reality. A development of the concept of representing a passenger cabin by using a data beamer is to use the known virtual reality (VR) technology to spatially represent a passenger cabin. In this way it is possible to experience a passenger cabin as a computer-generated interactive, virtual, accessible environment by means of a head-mounted display (HMD) for example.

The test rigs according to the invention comprising the simulation units 4 are fitted with hardware for running appropriate 3D-programs so only an HMD would have to be added.

Details of the electronic devices will follow from the respective metrological tasks defined for the first time by the invention, and these electronic devices are then produced and programmed in accordance with generally known conventional operational methods in the fields of metrology and electronic data processing.

The same applies to details of the standardised supports used in the scope of the invention. A person skilled in the field of fixture construction and testing is readily able to provide appropriate configurations of the inventive ideas using measures conventional in the field.

What is claimed is:

1. An arrangement, comprising:
a supporting structure, and
a reproduction of a passenger cabin system of a passenger aircraft comprising a set of seats on a 1:1 scale arranged within the supporting structure, and for receiving passenger cabin system components;
wherein the supporting structure is formed from a structure reproduction comprising standardized elements for receiving components of the passenger cabin system, and cabin fittings;
wherein the supporting structure further comprising standardized supports and connections, enabling installed passenger cabin system components to be tested under operating conditions, and
a displaceable test module is provided comprising multifunctional test rigs for operating, and testing the passenger cabin system components, said passenger cabin system components comprising:
at least one of a passenger entertainment system, an oxygen system, a cabin information and data system, a cabin installation of galleys and toilets, an air conditioning system, a door system, a heating system, a coffee maker, an oven, a ventilation system, a plurality of passenger seats, a system controller, and devices arranged in the electronics bay of an aircraft;
wherein each of the multifunctional test rigs comprises an I/O unit, a first simulating unit capable of simulating environments under which said passenger cabin system components operate, and a second simulation unit capable of simulating said passenger cabin system components;
wherein the first and second simulation units are configured to store graphics data; and
wherein the second simulation unit is configured to display cabin fittings variants by means of a computer generated interactive program.

2. The arrangement according to claim 1, wherein the multifunctional test rigs comprise standardized housings, standardized supports, and connections so that they are fittable on the displaceable test modules in a modular manner.

3. The arrangement according to claim 1, wherein the multifunctional test rigs contain devices for testing and operating the passenger cabin system components.

4. The arrangement according to claim 1, wherein the multifunctional test rigs for testing the passenger cabin systems are each configured as a plurality of self-contained computer systems comprising processors, storage media, and functional units capable of input and output stages.

5. The arrangement according to claim 1, wherein each test rig further comprising a test machine, a power supply unit, and a patch panel.

6. The arrangement according to claim 1, wherein the multifunctional test rigs have standardized plug and socket connectors for connecting to the data lines.

7. The arrangement according to claim 1, wherein the displaceable test module comprises an underbody in which at least one of a multifunctional test rig, a computer workstation, a printer, and a test bench is fittable.

8. The arrangement according to claim 7, wherein the displaceable test module comprises provisions for transport.

9. The arrangement according to claim 8, wherein the displaceable test module is capable of being moved by an air cushion transport system.

10. The arrangement according to claim 9, wherein a plurality of displaceable test modules are configured to be assembled in a modular manner forming a displaceable test platform.

11. The arrangement according to claim 10, wherein the displaceable test platform contains at least one of the plurality of displaceable test modules comprising at least one computer operator control panel.

12. The arrangement according to claim 1, wherein the structural reproduction comprises individual elements capable of being re-used.

13. The arrangement according to claim 12, wherein the structural reproduction is constructed in a modular manner capable of forming a floor with longitudinal supports and frames.

14. The arrangement according to claim 13, wherein the frames are connected to the longitudinal supports by brackets capable of being fixed in direction of the longitudinal supports.

15. The arrangement according to claim 13, wherein the frames are provided with at least one hinge.

16. The arrangement according to claim 13, wherein the frames are provided with at least one link plate.

17. The arrangement according to claim 11, wherein a universal data bus is provided capable of exchanging data between the multifunctional test rigs and between the multifunctional test rigs and the computer operator control panel of the computer workstation.

18. The arrangement according to claim 1, wherein the base of the displaceable test module is dimensioned such that it is stowable inside a container.

19. The arrangement according to claim 18, wherein walls, floor and roof of the container are capable to be separable.

20. The arrangement according to claim 19, wherein the walls of the container are capable to be used as support structures.

* * * * *